US011275524B2

(12) United States Patent
Park

(10) Patent No.: US 11,275,524 B2
(45) Date of Patent: Mar. 15, 2022

(54) MEMORY SYSTEM, MEMORY CONTROLLER, AND OPERATION METHOD OF MEMORY SYSTEM

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/081,026

(22) Filed: Oct. 27, 2020

(65) Prior Publication Data

US 2021/0373797 A1     Dec. 2, 2021

(30) Foreign Application Priority Data

Jun. 2, 2020    (KR) .......................... 10-2020-0066177

(51) Int. Cl.
*G06F 3/06*     (2006.01)

(52) U.S. Cl.
CPC .......... *G06F 3/0655* (2013.01); *G06F 3/0602* (2013.01); *G06F 3/0676* (2013.01); *G06F 3/0679* (2013.01)

(58) Field of Classification Search
CPC .... G06F 3/0602; G06F 3/0619; G06F 3/0655; G06F 3/0658; G06F 3/0676; G06F 3/0679; G06F 11/1008; G06F 11/102; G06F 11/1056
USPC ......... 711/103, 154; 714/6.11, 6.13, 54, 764
See application file for complete search history.

(56) References Cited

U.S. PATENT DOCUMENTS

| | | | |
|---|---|---|---|
| 9,734,029 B2* | 8/2017 | Ware | G06F 11/2094 |
| 2012/0284589 A1* | 11/2012 | Kim | H03M 13/3776 714/785 |
| 2015/0121166 A1* | 4/2015 | Goodman | G06F 11/1012 714/764 |
| 2016/0034354 A1* | 2/2016 | Hashimoto | G06F 11/108 714/764 |
| 2018/0024878 A1* | 1/2018 | Das | G06F 11/00 714/764 |

FOREIGN PATENT DOCUMENTS

| | | |
|---|---|---|
| KR | 10-2016-0141557 | 12/2016 |
| KR | 10-2017-0124673 | 11/2017 |
| KR | 10-2019-0077909 | 7/2019 |

* cited by examiner

*Primary Examiner* — Gary J Portka
(74) *Attorney, Agent, or Firm* — IP & T Group LLP

(57) ABSTRACT

Embodiments of the present disclosure relate to a memory system, a memory controller, and an operation method of a memory system. According to embodiments of the present disclosure, the memory system may transmit, to a host, target data, and, upon receiving, from the host, information indicating that at least one bit-flip has occurred in the target data, may perform an error handling operation on the at least one bit-flip in the target data. Accordingly, the memory system is able to reduce resource used in checking the bit-flip and to alleviate the constraints of the algorithms used in checking for the bit-flip.

12 Claims, 11 Drawing Sheets

MEMORY SYSTEM, MEMORY CONTROLLER, AND OPERATION METHOD OF MEMORY SYSTEM

CROSS REFERENCE TO RELATED APPLICATION

The present application claims priority under 35 U.S.C. 119(a) to Korean patent application number 10-2020-0066177, filed on Jun. 2, 2020, which is incorporated herein by reference in its entirety.

BACKGROUND

1. Field of the Invention

Embodiments of the present disclosure relate to a memory system, a memory controller, and an operation method of a memory system.

2. Description of the Prior Art

A memory system, e.g., a storage device, stores data on the basis of a request from a host, such as a computer, a mobile terminal (for example, a smartphone or a tablet), or any of various other electronic devices. The memory system may include not only a device configured to store data in a magnetic disk such as a hard disk drive (HDD), but also a device configured to store data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory in the memory system. The memory controller may drive firmware for performing a logical operation for controlling such operations.

When the memory controller drives firmware, a bit-flip may occur in the firmware loaded in the memory controller due to defects in the memory system. Since a bit-flip occurring in the firmware may cause the firmware to malfunction, the memory controller is required to check whether or not a bit-flip has occurred in the code of the firmware. In doing so, the memory controller uses resources, which may degrade the performance of a read, write, or erase operation.

SUMMARY

Embodiments of the present disclosure may provide a memory system, a memory controller, and an operation method of a memory system capable of reducing resources used in checking for a bit-flip.

In addition, embodiments of the present disclosure may provide a memory system, a memory controller, and an operation method of a memory system capable of alleviating the constraints of the algorithms used in checking for a bit-flip.

In one aspect, embodiments of the present disclosure may provide a memory system including a memory device and a memory controller configured to control the memory device.

The memory controller may transmit, to a host, target data.

Upon receiving, from the host, information indicating that at least one bit-flip has occurred in the target data, the memory controller may perform an error handling operation on the at least one bit-flip in the target data. The target data may be a portion of firmware code.

The memory controller may transmit the target data to the host after randomizing the target data. The memory controller may randomize the target data, based on the seed used to randomize data received from the host.

The memory controller may periodically transmit the target data to the host. The memory controller may periodically transmit the target data to the host according to period information received from the host.

In another aspect, embodiments of the present disclosure may provide a memory controller including a memory interface configured to communicate with a memory device and a control circuit configured to control the memory device.

The control circuit may transmit, to a host, target data.

Upon receiving, from the host, information indicating that at least one bit-flip has occurred in the target data, the control circuit may perform an error handling operation on the at least one bit-flip in the target data. The target data may be a portion of firmware code.

The control circuit may transmit the target data to the host after randomizing the target data. The control circuit may randomize the target data, based on the seed used to randomize data received from the host.

The control circuit may periodically transmit the target data to the host. The control circuit may periodically transmit the target data to the host according to period information received from the host.

In another aspect, embodiments of the present disclosure may provide an operation method of a memory system including a memory device and a memory controller for controlling the memory device.

The operation method of a memory system may include a step of transmitting, to a host, target data.

The target data may be a portion of firmware code.

Meanwhile, the target data may be randomized when the target data is transmitted to the host. The target data may be randomized based on the seed used to randomize data received from the host.

In addition, the operation method of a memory system may include a step of receiving, from the host, information indicating that at least one bit-flip has occurred in the target data.

In addition, the operation method of a memory system may include a step of performing an error handling operation on the at least one bit-flip in the target data.

The target data may be periodically transmitted to the host. The target data may be periodically transmitted to the host according to period information transmitted by the host.

In another aspect, embodiments of the present disclosure may provide a system which includes a host and a memory system configured to obtain a segment of firmware data, randomize the segment and transmit the randomized segment to the host.

The host may receive the segment and check the segment to determine whether at least one bit-flip has occurred in the randomized segment.

When it is determined that at least one bit-flip has occurred in the randomized segment, the host may transmit, to the memory system, information indicating that at least one bit-flip has occurred in the segment for use by the memory system to perform an error handling operation on the randomized segment.

According to embodiments of the present disclosure, it is possible to reduce resources used in checking for a bit-flip.

In addition, according to embodiments of the present disclosure, it is possible to alleviate the constraints of the algorithms used in checking for a bit-flip.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
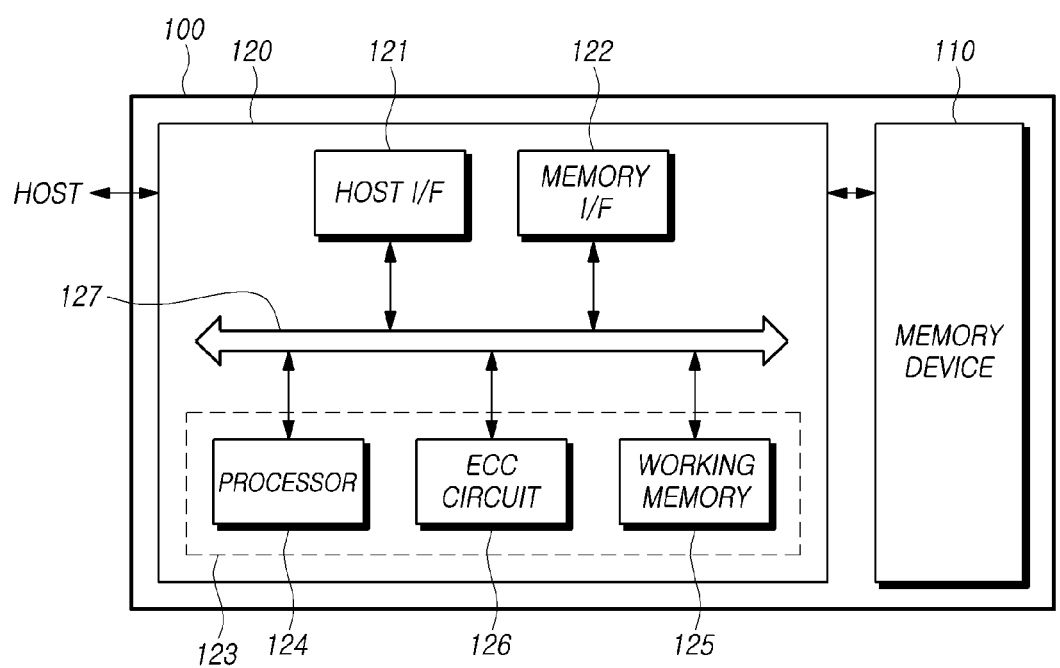
FIG. 1 is a schematic diagram illustrating a configuration of a memory system according to an embodiment of the present disclosure.

FIG. 1 is a diagram illustrating the schematic configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), and/or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array selected using the address. That is, the memory device 110 may perform an operation corresponding to the received command in a memory area of the memory device having a physical address corresponding to the received address from the controller.

For example, the memory device 110 may perform a program operation, a read operation, an erase operation, and the like. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (or program), read, erase, and background operations with regard to the memory device 110. The background operation may be, for example, a garbage collection (GC) operation, a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In another embodiment, the memory controller 120 and the host may be integrated and implemented as a single device. In the following description, the memory controller 120 and the host are separate devices.

The memory controller 120 may include a host interface (I/F) 121, a memory interface 122, and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to control of the control circuit 123.

The control circuit 123 may be configured to control the operation of the memory device 110 by performing operations for overall control of the memory controller 120. For example, the control circuit 123 may include a processor 124 and a working memory 125. The control circuit 123 may further include an error detection and correction (detection/correction) circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control overall operation of the memory controller 120 and, in order to perform a logical operation, may execute (or drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). The flash translation layer is configured to translate between a logical address that the host requests the memory system 100 to provide and a physical address of the memory device 110. The host interface layer is configured to interpret a command that the host issues to the memory system 100 (or storage device) and to deliver the same to the FTL. The flash interface layer is configured to deliver a command issued by the FTL to the memory device 110.

For example, the firmware may be stored in the memory device 110, then loaded into the working memory 125.

The working memory 125 may store firmware, program codes, commands, or pieces of data to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect error bit(s) of target data by using an error correction code, and to correct the detected error bit(s). For example, the target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect error bit(s), sector by sector, with regard to each piece of read data. That is, each piece of read data may include multiple sectors. As used herein, a sector may refer to a data unit smaller than the read unit (e.g., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than or equal to the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. One or more of the above-mentioned constituent elements may be omitted from the memory controller 120, and/or one or more of the above-mentioned constituent elements may be integrated into a single element. In addition, in some cases, one or more other constituent elements may be added, in addition to the above-mentioned constituent elements of the memory controller 120.

Hereinafter, the memory device 110 is described in more detail with reference to FIG. 2.

Figure 2:
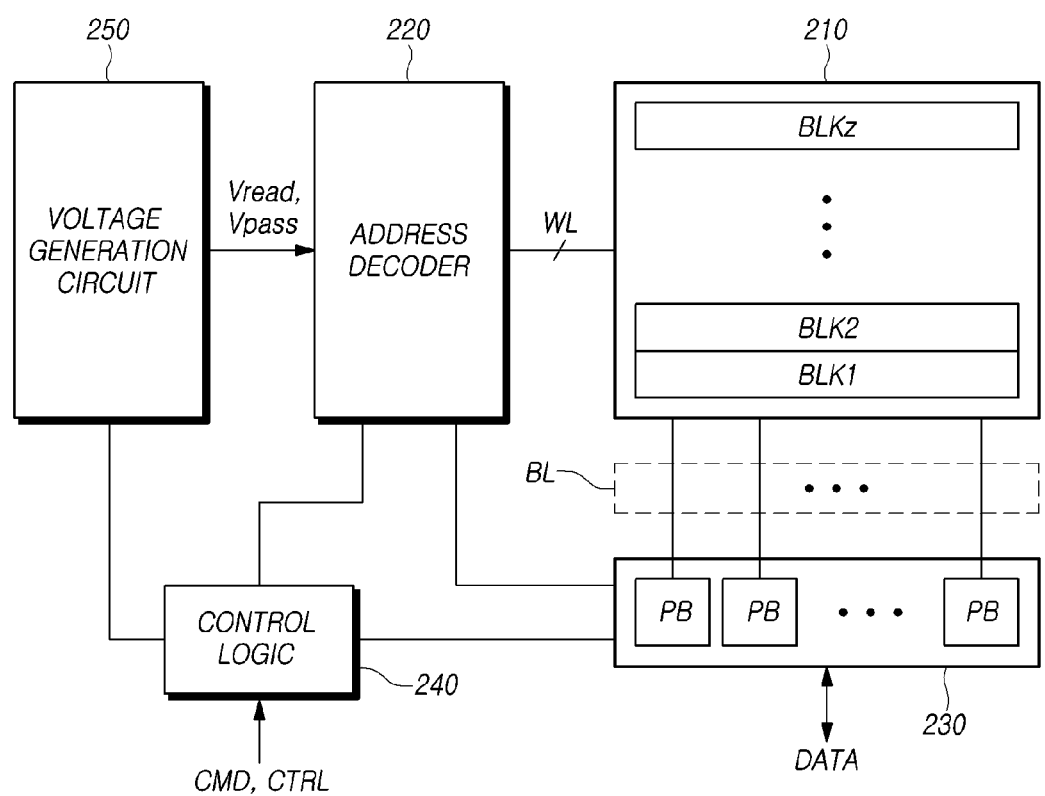
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read and write (read/write) circuit 230, control logic 240, and a voltage generation circuit 250.

The memory cell array 210 may include multiple memory blocks BLK1-BLKz, where z is a natural number greater than or equal to 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells in the memory cell array 210 may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

The address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 250 may apply the read voltage Vread to a selected word line WL inside a selected memory block, and may apply the pass voltage Vpass to the remaining non-selected word lines WL.

During a program verification operation, the address decoder 220 may apply a verification voltage generated by the voltage generation circuit 250 to a selected word line WL inside a selected memory block, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that is used in a data processing function and, in some cases, may further include a cache buffer used in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK in the memory device 110 may consist of multiple pages PG and multiple strings. The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (i.e., write operation) of the memory block may be performed page by page, and an erase operation may be performed memory block by memory block.

Figure 3:
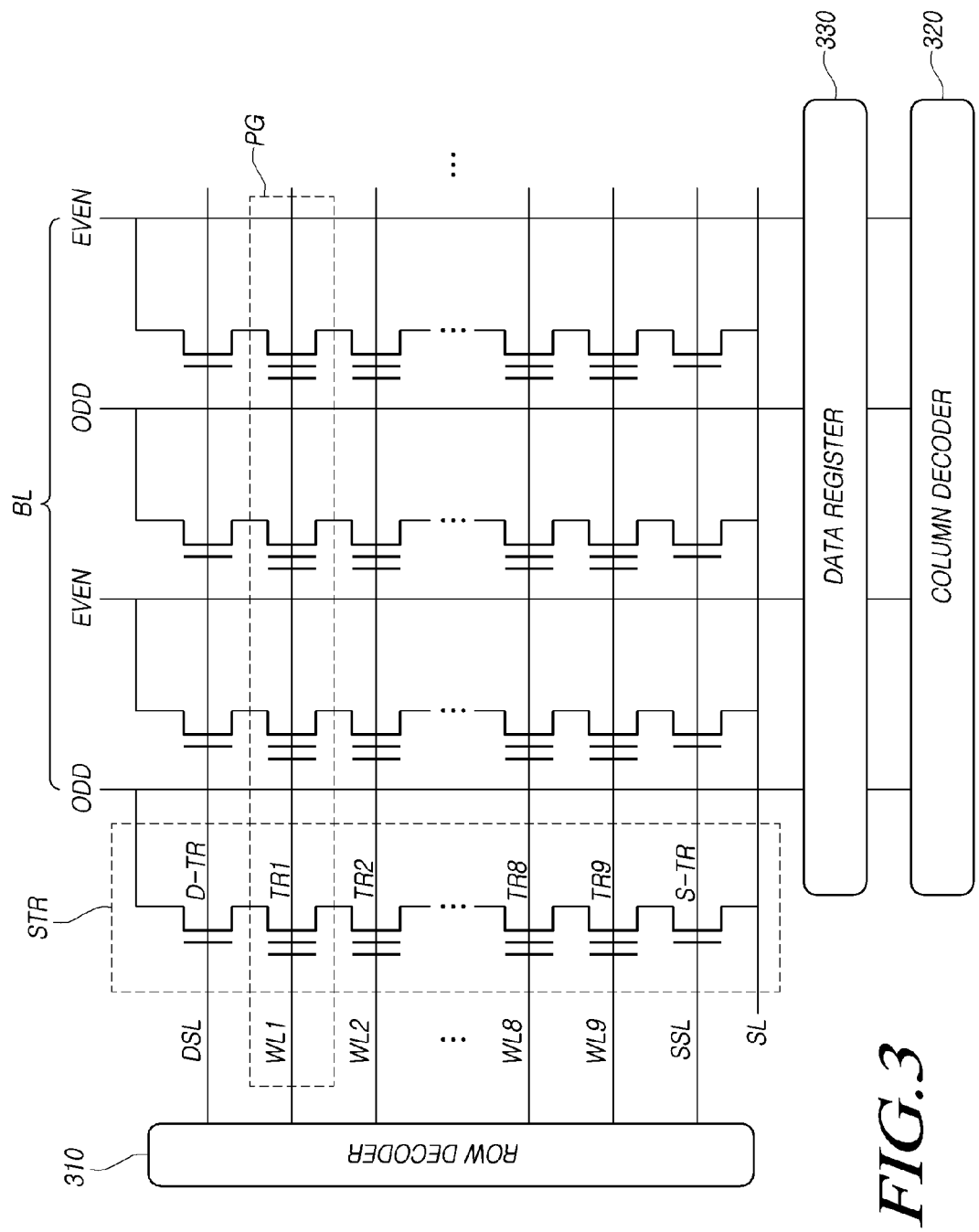
FIG. 3 is a diagram illustrating a structure of word lines and bit lines of a memory device according to an embodiment of the present disclosure.

FIG. 3 is a diagram illustrating a structure of word lines WL and bit lines BL of a memory device 110 according to an embodiment of the present disclosure.

Referring to FIG. 3, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320 while being distinguished between odd-numbered bit lines BL and even-numbered bit lines BL.

For accessing a memory cell MC, the address may be entered to the core area first through the input/output and then through the row decoder 310 and the column decoder 320 such that a corresponding target memory cell can be designated. As used herein, designating a target memory cell refers to accessing one of the memory cells MC at the sites of intersection between the word lines WL1-WL9 connected to the row decoder 310 and the bit lines BL connected to the column decoder 320, for programming data therein or for reading programmed data therefrom.

Pages PG in a first direction (for example, horizontal direction as seen in FIG. 3) are bound by a commonly used line referred to as a word line WL, and strings STR in a second direction (for example, vertical direction as seen in FIG. 3) are bound (i.e., connected) by a common line referred to as a bit line BL. As used herein, being commonly bound refers to being structurally connected by the same material and simultaneously receiving the same voltage during voltage application. The voltage applied to a memory cell MC further down the line among memory cells MC connected in series may slightly differ from the voltage applied to a memory cell MC further up line, due to the voltage drop across the preceding memory cell(s) MC.

The data register 330 plays an important role because all data processing by the memory device 110, including program and read operations, occurs via the data register 330. If data processing by the data register 330 is delayed, all of the other areas need to wait until the data register 330 finishes the data processing. In addition, degradation of performance of the data register 330 may degrade overall performance of the memory device 110.

In the example illustrated in FIG. 3, in one string STR, multiple transistors TR1-TR9 may be connected to multiple word lines WL1-WL9, respectively. The multiple transistors TR1-TR9 correspond to memory cells MC. In this example, each of the multiple transistors TR1-TR9 include a control gate CG and a floating gate FG.

The multiple word lines WL1-WL9 include two outermost word lines WL1 and WL9. A first selection line DSL may be additionally arranged outside the first outermost word line WL1, which is closer to the data register 330 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 330. The second selection transistor S-TR plays the role of a switch that turns on or off the connection between the corresponding string STR and the source line SL. That is, the first selection transistor D-TR and the second selection transistor S-TR play the role of gatekeepers which are positioned at opposite ends of the corresponding string STR to deliver or block signals.

During a program operation, the memory system 100 fills the target memory cell MC of the bit line BL which is to be programmed with electrons. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 4:
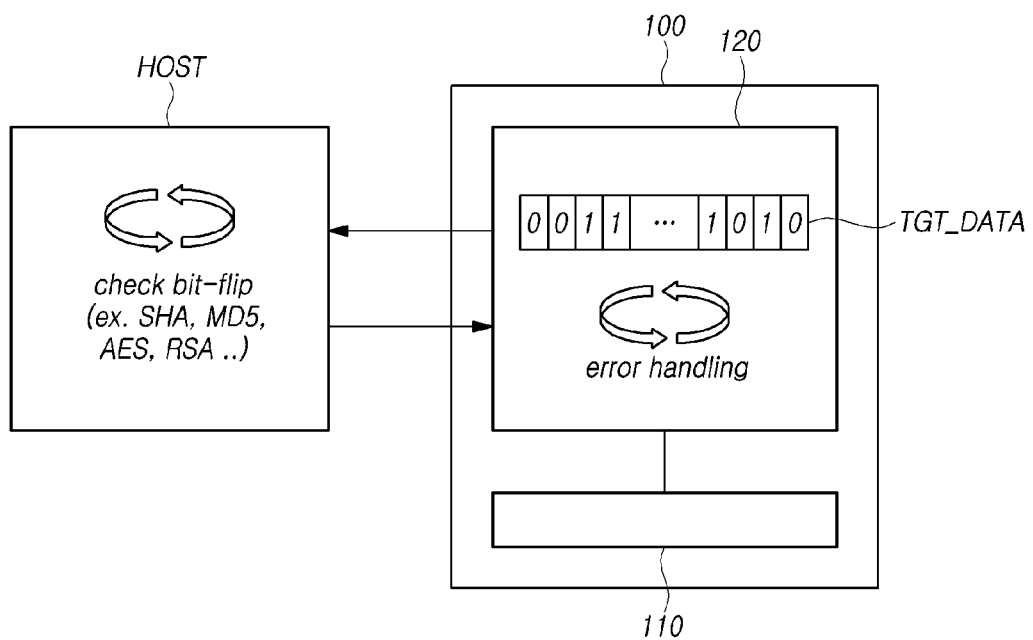
FIG. 4 is a schematic diagram illustrating operation of a memory system according to an embodiment of the present disclosure.

FIG. 4 is a schematic diagram illustrating operation of a memory system 100 according to an embodiment of the present disclosure.

Referring to FIG. 4, a memory controller 120 of the memory system 100 may transmit target data (TGT_DATA) to a host (HOST).

The target data is used by the memory system 100 to identify whether or not a bit-flip occurs. The memory system 100 may transmit the target data to the host in order to identify whether or not a bit-flip, that is, an error in which one or more of the bits of the target data has changed from 0 to 1 or vice versa, has occurred in the target data. The target data may be any suitable size (e.g., a page size or a block size).

The host may check whether or not a bit-flip has occurred in the target data transmitted by the memory controller 120. The host may use various algorithms such as secure hash algorithm (SHA), message digest 5 (MD5), advanced encryption standard (AES), Ron Rivest, Adi Shamir and Leonard Adleman (RSA), or the like in order to check whether bit-flip(s) have occurred in the target data.

If the host determines that a bit-flip has occurred in the target data, the host may transmit, to the memory controller 120, information indicating that a bit-flip has occurred in the target data.

Upon receiving the information indicating that a bit-flip has occurred in the target data, the memory controller 120 may perform an error handling operation on the flipped bit(s) of the target data. The error handling operation may correct the error(s), discard the error-containing target data, record the error(s) in a log, initialize the memory system 100, or the like.

For example, when a bit-flip has occurred in the target data, the memory controller 120 may perform a specified error handling operation depending on the number of bits that have flipped.

When the number of bits changed from 0 to 1 or from 1 to 0 in the target data is less than or equal to the maximum number of correctable bits, the memory controller 120 may correct the flipped bits in the target data.

When the number of bits changed from 0 to 1 or from 1 to 0 in the target data exceeds the maximum number of correctable bits, the memory controller 120 may discard the target data, or may initialize the memory system 100.

The reason why the memory controller 120 of the memory system 100 identifies whether or not a bit-flip occurs in the target data through the host as described above is as follows.

First, if the memory controller 120 uses resources of the memory controller 120 in order to directly identify whether or not a bit-flip occurs in the target data, less resources are available to the memory controller 120 for performing a read, write, or erase operation. Second, since the computation speed of the memory controller 120 is lower than that of the host, the types of algorithms available to the memory controller 120 to check for the bit-flip are limited.

Accordingly, the memory controller 120 may check whether or not a bit-flip occurs in the target data through the host, instead of directly performing such check, thereby reducing the resources of the memory controller 120 used in checking for the bit-flip. Thus, more resources of the memory controller 120 are available to perform a read, write, or erase operation. In addition, there is less constraint on the type of algorithms that can be used in checking for the bit-flip in the target data.

Hereinafter, operation of the memory system and the host described above are described with reference to a flowchart in FIG. 5.

Figure 5:
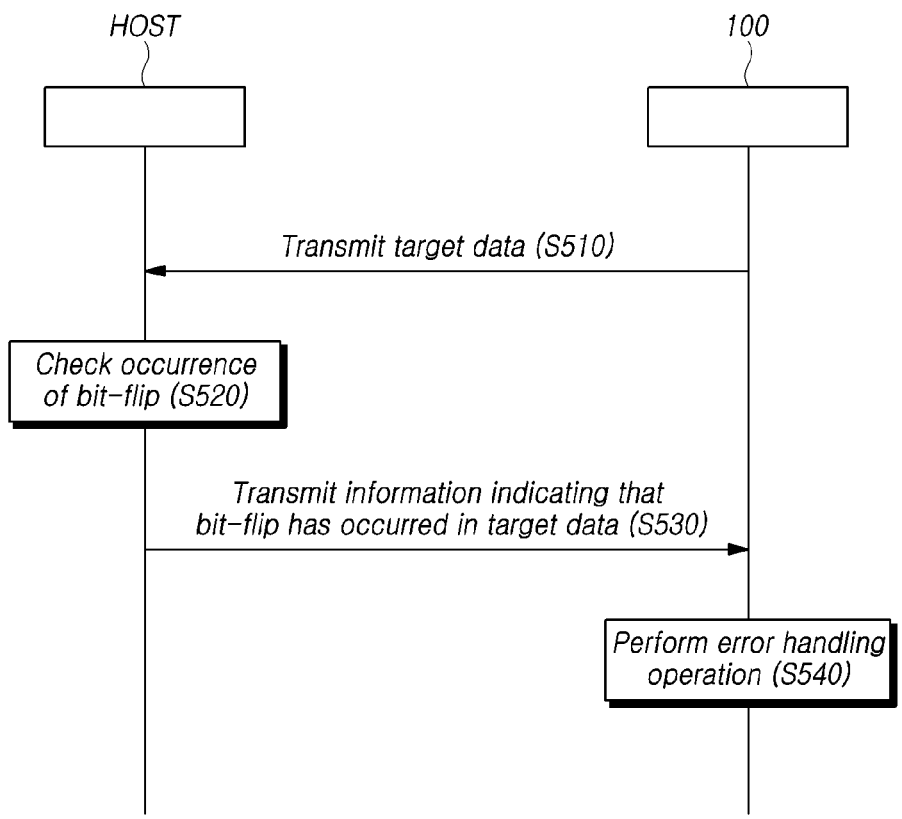
FIG. 5 is a flowchart illustrating an operation between a host and a memory system according to an embodiment of the present disclosure.

FIG. 5 is a flowchart illustrating an operation between a host and a memory system 100 according to an embodiment of the present disclosure.

First, the memory system 100 may transmit the target data (TGT_DATA) described above to the host (HOST) (S510).

The host may check whether or not a bit-flip has occurred in the target data received from the memory system 100 (S520). As described above, the host may use algorithms such as SHA, MD5, RSA, AES, and the like in order to identify a bit-flip in the target data.

If the host determines that a bit-flip has occurred in the target data, the host may transmit, to the memory system 100, information indicating that a bit-flip has occurred in the target data (S530).

Upon receiving the information from the host indicating that a bit-flip has occurred in the target data, the memory system 100 may perform an error handling operation to process the bit-flip in the target data (S540).

Figure 6:
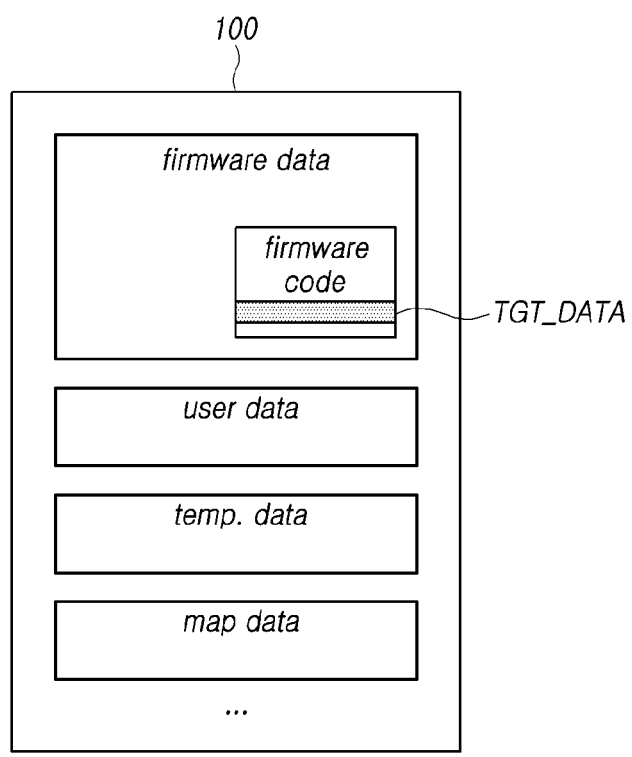
FIG. 6 is a diagram illustrating an example of target data according to an embodiment of the present disclosure.

FIG. 6 is a diagram illustrating an example of target data (TGT_DATA) according to an embodiment of the present disclosure.

Referring to FIG. 6, the memory controller 120 may store firmware data for driving the memory system 100, user data received from the host or read out from the memory device 100, data temporarily generated in the process of operating the memory controller 120 (temporary or temp. data), map data indicating information on mapping between logical addresses and physical addresses, and the like.

In some embodiments, the firmware data, the user data, the temporary data, and the like described above may be stored in a working memory 125 of the memory controller 120.

The target data, which is used to identify whether or not a bit-flip has occurred, may be a portion of firmware code loaded to drive the memory controller 120. This is due to the fact that if a bit-flip occurs in the firmware code, there is high probability of the memory controller 120 malfunctioning, which is highly likely to damage the data stored in the memory device 110 of the memory system 100.

When transmitting the target data to the host, the memory system 100 may separately process the target data, and may then transmit the processed target data, instead of simply transmitting unprocessed target data. Hereinafter, this operation is described in detail with reference to FIG. 8.

Figure 7:
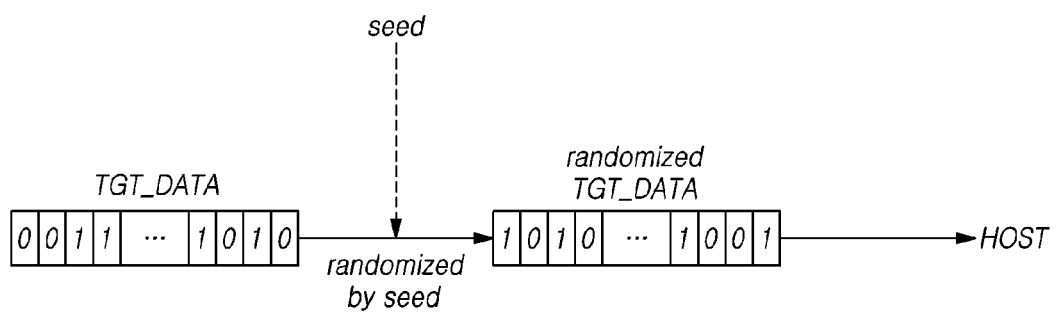
FIG. 7 is a diagram illustrating an operation in which a memory system randomizes target data according to an embodiment of the present disclosure.

FIG. 7 is a diagram illustrating an operation in which a memory system 100 randomizes target data according to an embodiment of the present disclosure.

Referring to FIG. 7, when transmitting target data to the host, the memory controller 120 of the memory system 100 may randomize the target data, and may then transmit the randomized target data to the host, instead of transmitting nonrandomized target data.

The reason why the memory controller 120 randomizes the target data and transmits the same to the host is because of a security issue with respect to the target data. The target data may have a critical effect on the operation of the memory system 100, like the firmware code described above. Accordingly, the memory controller 120 acts through the host to prevent the target data from being publicly exposed or otherwise compromised so that an unauthorized user may access the target data.

Accordingly, the memory controller 120 randomizes the target data TGT_DATA and transmits the same to the host, and the host checks whether or not there is a bit-flip in the randomized target data. Randomizing the same data using the same seed may obtain the same result. Accordingly, if a bit-flip is identified in the randomized target data, it may be determined that a bit-flip has occurred in the raw target data as well.

The memory controller 120 may use the randomizing seed described in connection with FIG. 1 to randomize the target data. That is, the memory controller 120 may randomize the target data based on the seed used in randomizing the data received from the host. In this case, the memory controller 120 may reduce the resources used to manage a separate seed for randomizing the target data.

Hereinafter, the time at which the memory system 100 transmits target data to the host is described.

Figure 8:
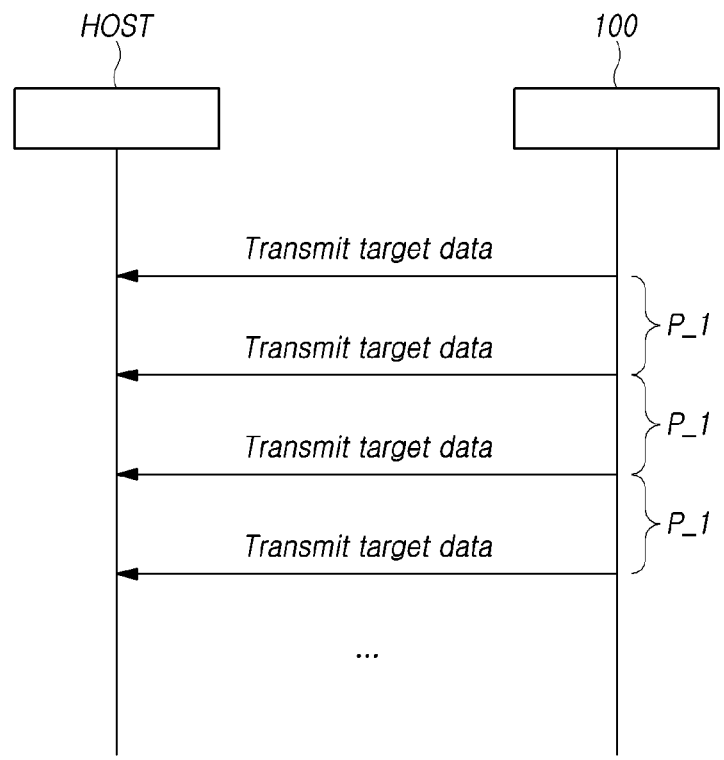
FIG. 8 is a diagram illustrating an example of an operation in which a memory system periodically transmits target data to a host according to an embodiment of the present disclosure.

FIG. 8 is a diagram illustrating an example of an operation in which a memory system 100 periodically transmits target data to a host according to an embodiment of the present disclosure.

Referring to FIG. 8, the memory system 100 may periodically transmit target data (TGT_DATA) to the host (HOST), for example, every period P_1.

The memory system 100 is unable to predict the time at which a bit-flip occurs in the target data. Accordingly, the memory system 100 periodically transmits the target data to the host, so that the target data is periodically checked for a bit-flip.

In an embodiment, the period P_1 may be a fixed time configured in the memory system 100.

In another embodiment, the period P_1 may be determined depending on the state of the memory system 100. For example, the period P_1 may be determined depending on the frequency of occurrence of a bit-flip in the target data during a specific unit time. When a bit-flip occurs more frequently in the target data TGT_DATA, the memory controller 120 of the memory system 100 may reduce the period P_1 in order to check for a bit-flip more frequently. When a bit-flip occurs less frequently in the target data TGT_DATA, the memory controller 120 may increase the period P_1 in order to reduce the resources used in checking for a bit-flip.

Figure 9:
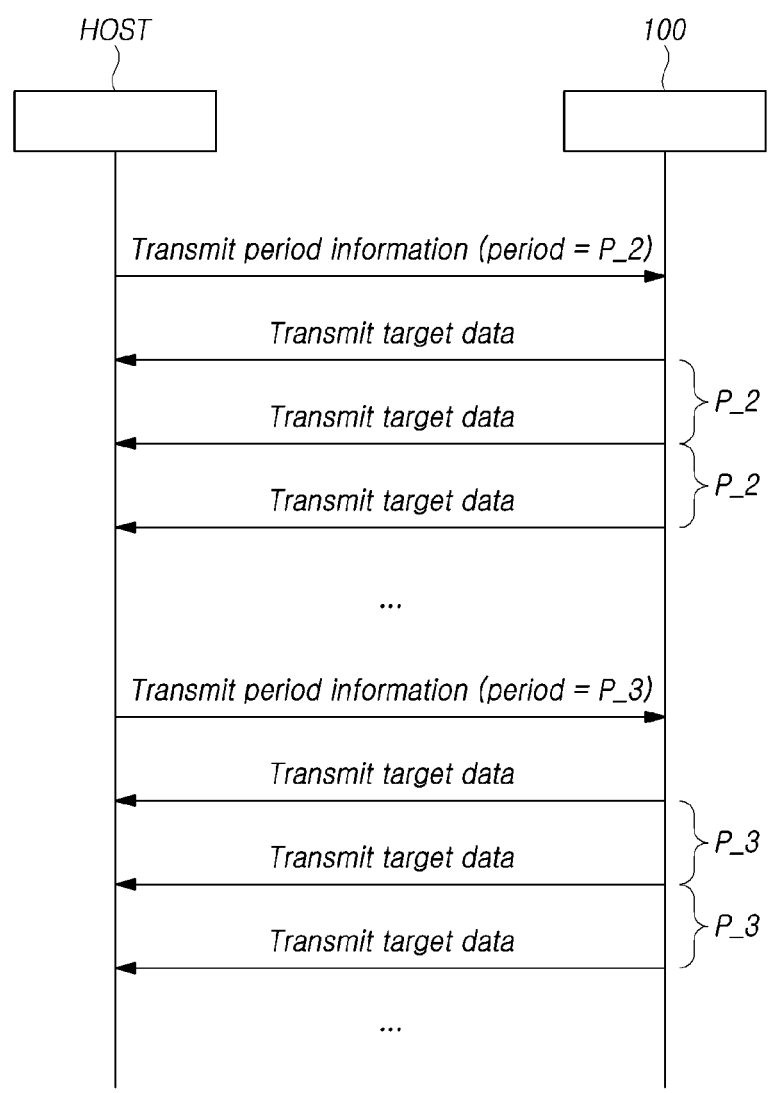
FIG. 9 is a diagram illustrating another example of an operation in which a memory system periodically transmits target data to a host according to an embodiment of the present disclosure.

FIG. 9 is a diagram illustrating another example of an operation in which a memory system 100 periodically transmits target data to a host according to an embodiment of the present disclosure.

Referring to FIG. 9, the memory system 100 may periodically transmit target data (TGT_DATA) to the host (HOST) according to a set period contained in information received from the host. That is, the host determines the period or frequency at which the target data is transmitted by the memory system 100 to the host.

When the host transmits to the memory system 100 period information indicating that the period is P_2, the memory system 100 may periodically transmit target data to the host every period P_2.

Thereafter, the host may transmit, to the memory system 100, period information indicating that the period is P_3. That is, the host may change the period or frequency of target data transmission from P_2 to P_3. Once the period is set to be P_3, the memory system 100 may periodically transmit target data to the host every period P_3.

Figure 10:
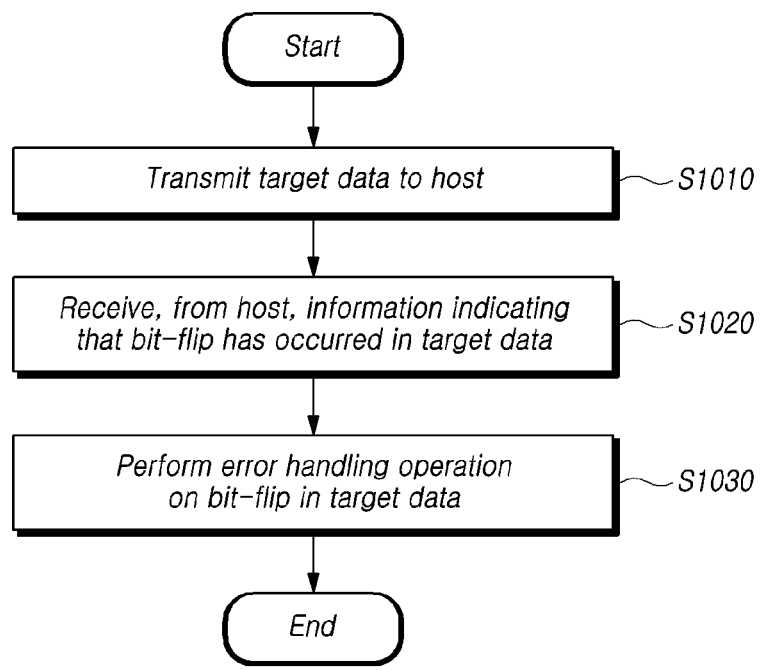
FIG. 10 is a flowchart illustrating an operation method of a memory system according to an embodiment of the present disclosure.

FIG. 10 is a flowchart illustrating an operation method of a memory system 100 according to an embodiment of the present disclosure.

Referring to FIG. 10, an operation method of the memory system 100 may include an operation of transmitting, to a host, target data that is used to identify whether or not a bit-flip has occurred (S1010).

The target data may be a portion of firmware code.

Before transmitting the target data to the host, the target data may be randomized. The target data may be randomized based on the seed used in randomizing the data received from the host.

The operation method of the memory system 100 may include an operation of receiving, from the host, information indicating that a bit-flip has occurred in the target data (S1020).

The operation method of the memory system 100 may include an operation of performing an error handling operation on one or more flipped bits in the target data in the target data TGT_DATA (S1030).

In embodiments, the target data may be periodically transmitted to the host.

The period may be determined by the memory system 100, or may be determined by the host. In the latter case, the target data may be periodically transmitted to the host according to period information received from the host.

In embodiments, the operation of the memory controller 120 described above may be controlled by the control circuit 123, and may be performed in such a manner that the processor 124 executes (or drives) firmware in which the memory controller 120 is programmed.

Figure 11:
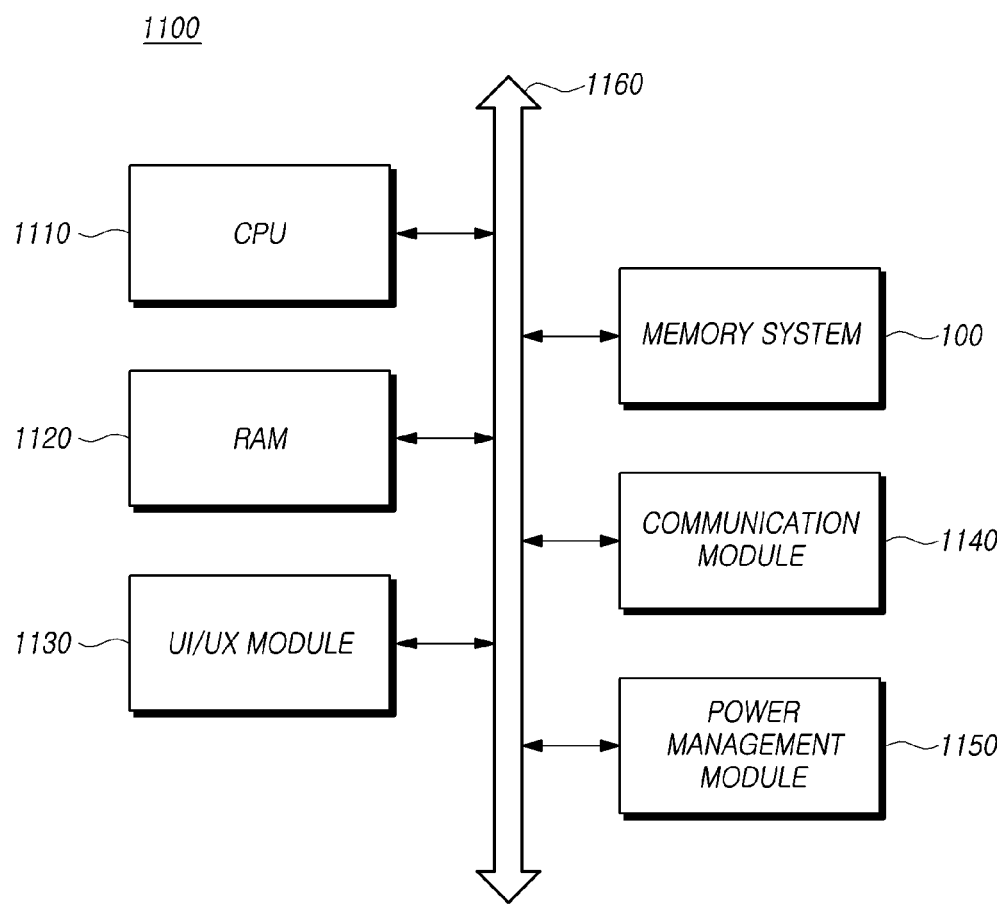
FIG. 11 is a diagram illustrating a configuration of a computing system according to an embodiment of the present disclosure.

FIG. 11 is a diagram illustrating a configuration of a computing system 1100 according to an embodiment of the present disclosure.

Referring to FIG. 11, the computing system 1100 may include: a memory system 100 electrically connected to a system bus 1160; a central processing unit (CPU) 1110 configured to control overall operation of the computing system 1100; a random access memory (RAM) 1120 configured to store data and information related to operations of the computing system 1100; a user interface/user experience (UI/UX) module 1130 configured to provide the user with a user environment; a communication module 1140 configured to enable wired or wireless communication with an external device; and a power management module 1150 configured to manage power used by the computing system 1100.

The computing system 1100 may be a personal computer (PC) or may include a mobile terminal such as a smartphone, a tablet or various electronic devices.

The computing system 1100 may further include a battery for supplying an operating voltage, an application chipset, a graphic-related module, a camera image processor, and a DRAM. Of course, as those skilled in the art understand, the computing system 1100 may include additional elements.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and/or the like. In addition, the memory system 100 may be implemented as any of various types of storage devices, which may be embodied in any of various types of electronic devices.

According to embodiments of the present disclosure, the operation delay time of the memory system may be reduced or minimized. In addition, according to an embodiment of the present disclosure, overhead occurring in the process of calling a specific function may be reduced or minimized. Although various embodiments of the present disclosure have been illustrated and described, those skilled in the art will appreciate that various modifications, additions and substitutions are possible, without departing from the scope and spirit of the invention as set forth in the accompanying claims. Therefore, the disclosed embodiments are provided for the sake of brevity and clarity. The scope of the present invention, however, encompasses variations of any of the disclosed embodiments that fall within the scope of the claims.

What is claimed is:

1. A memory system comprising:
a memory device configured to store target data; and
a memory controller configured to control the memory device,
transmit, to a host, after randomizing the target data, randomized target data, wherein the memory controller is configured to randomize the target data based on a seed that is same as the seed used in randomizing data received from the host and to be stored in the memory device, and
upon receiving, from the host, information indicating that at least one bit-flip has occurred in the target data, perform an error handling operation on the at least one bit-flip in the target data.

2. The memory system of claim 1, wherein the target data is a portion of firmware code.

3. The memory system of claim 1, wherein the memory controller is configured to periodically transmit the target data to the host, and
wherein a period of transmitting the target data is determined depending on a frequency of an occurrence of a bit-flip in the target data during a specific unit time.

4. The memory system of claim 3, wherein the memory controller is configured to periodically transmit the target data to the host according to period information received from the host.

5. A memory controller comprising:
a memory interface configured to communicate with a memory device configured to store target data; and
a control circuit configured to control the memory device,
transmit, to a host, after randomizing the target data, randomized target data, wherein the control circuit is configured to randomize the target data based on a seed that is same as the seed used in randomizing data received from the host and to be stored in the memory device, and
upon receiving, from the host, information indicating that at least one bit-flip has occurred in the target data, perform an error handling operation on the at least one bit-flip in the target data.

6. The memory controller of claim 5, wherein the target data is a portion of firmware code.

7. The memory controller of claim 5, wherein the control circuit is configured to periodically transmit the target data to the host, and
wherein a period of transmitting the target data is determined depending on a frequency of an occurrence of a bit-flip in the target data during a specific unit time.

8. The memory controller of claim 7, wherein the control circuit is configured to periodically transmit the target data to the host according to period information received from the host.

9. An operation method of a memory system, the method comprising:
transmitting, to a host, after randomizing the target data, randomized target data, wherein the target data is randomized based on a seed that is same as the seed used in randomizing data received from the host and to be stored in a memory device in the memory system;
receiving, from the host, information indicating that at least one bit-flip has occurred in the target data; and
performing an error handling operation on the at least one bit-flip in the target data.

10. The method of claim 9, wherein the target data is a portion of firmware code.

11. The method of claim 9, wherein the target data is periodically transmitted to the host, and
wherein a period of transmitting the target data is determined depending on a frequency of an occurrence of a bit-flip in the target data during a specific unit time.

12. The method of claim 11, wherein the target data is periodically transmitted to the host according to period information received from the host.

* * * * *